(12) United States Patent
Noelke et al.

(10) Patent No.: US 7,671,111 B2
(45) Date of Patent: Mar. 2, 2010

(54) MONITORING COLUMN BREAKTHROUGH IN A PROCESS FOR REMOVING FLUOROSURFACTANT FROM AQUEOUS FLUOROPOLYMER DISPERSIONS

(75) Inventors: Charles Joseph Noelke, Wilmington, DE (US); Steven H. Swearingen, Wilmington, DE (US); David William Johnson, Washington, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1055 days.

(21) Appl. No.: 11/351,125

(22) Filed: Feb. 9, 2006

(65) Prior Publication Data

US 2006/0175261 A1 Aug. 10, 2006

Related U.S. Application Data

(60) Provisional application No. 60/651,605, filed on Feb. 10, 2005.

(51) Int. Cl.
*C08L 1/00* (2006.01)

(52) U.S. Cl. .................. 523/310; 210/662; 524/544; 524/700; 524/800; 524/805; 554/191

(58) Field of Classification Search ............. 523/310; 210/662; 524/544, 700, 800, 805; 554/191
See application file for complete search history.

(56) References Cited

U.S. PATENT DOCUMENTS

| | | | |
|---|---|---|---|
| 2,559,752 A | 7/1951 | Berry | |
| 3,037,953 A | 6/1962 | Marks et al. | |
| 3,704,272 A | 11/1972 | Holmes | |
| 3,882,153 A | 5/1975 | Seki et al. | |
| 4,282,162 A | 8/1981 | Kuhls | |
| 4,369,266 A | 1/1983 | Kuhls et al. | |
| 4,996,160 A * | 2/1991 | Hausman Hazlitt et al. | .... 436/2 |
| 6,153,688 A | 11/2000 | Miura et al. | |
| 6,706,193 B1 * | 3/2004 | Burkard et al. | ............. 210/662 |
| 6,720,437 B2 * | 4/2004 | Jones et al. | ................. 554/191 |
| 6,825,250 B2 * | 11/2004 | Epsch et al. | ................ 523/310 |
| 6,833,403 B1 * | 12/2004 | Bladel et al. | ................ 524/458 |
| 6,861,466 B2 | 3/2005 | Dadalas et al. | |
| 2003/0125421 A1 * | 7/2003 | Bladel et al. | ................ 523/310 |
| 2004/0143052 A1 | 7/2004 | Epsch et al. | |
| 2004/0186219 A1 | 9/2004 | Dadalas et al. | |
| 2006/0135680 A1 * | 6/2006 | Johnson et al. | ............. 524/544 |

FOREIGN PATENT DOCUMENTS

| | | |
|---|---|---|
| EP | 1 155 055 B1 | 4/2003 |
| EP | 1 364 972 A1 | 11/2003 |
| EP | 1364972 A1 * | 11/2003 |
| EP | 1 561 742 A1 | 8/2005 |
| WO | WO 03/059992 A1 | 7/2003 |

OTHER PUBLICATIONS

Deutscher, Murray P., Guide to Protein Purification, vol. 182 of "Methods in Enzymology", pp. 309-317, (1990).*

* cited by examiner

*Primary Examiner*—Peter D. Mulcahy
*Assistant Examiner*—Henry Hu

(57) ABSTRACT

A process for reducing the fluorosurfactant content of a stabilized fluorosurfactant-containing aqueous fluoropolymer dispersion by passing dispersion through a first fixed bed of anion exchange resin to reduce fluorosurfactant content. The first fixed bed has a working zone which moves though the column as the ion exchange resin is saturated. The process includes monitoring a property of the dispersion as the dispersion exits the fixed bed to determine break though of the working zone indicating saturation of the fixed bed. The property being monitored is selected from the group consisting of pH and conductivity.

8 Claims, No Drawings

MONITORING COLUMN BREAKTHROUGH IN A PROCESS FOR REMOVING FLUOROSURFACTANT FROM AQUEOUS FLUOROPOLYMER DISPERSIONS

FIELD OF THE INVENTION

This invention relates to a process for removing fluorosurfactant from aqueous fluoropolymer dispersions using anion exchange resin.

BACKGROUND OF THE INVENTION

Fluorosurfactants are typically used as a polymerization aid in the dispersion polymerization of fluoropolymers, the fluorosurfactants functioning as a non-telogenic dispersing agent. For example, an early description of this use of fluorosurfactants is found in U.S. Pat. No. 2,559,752 (Berry). Because of environmental concerns and because fluorosurfactants are expensive, processes have been developed for their recovery from waste water and from aqueous fluoropolymer dispersions.

One method for removal of fluorosurfactants from fluoropolymer dispersions is disclosed in U.S. Pat. No. 4,369,266 (Kuhls et al.) and includes the addition of a stabilizing surfactant followed by concentration by ultrafiltration. This patent teaches that a high proportion of the fluorosurfactant can be removed via the aqueous permeate. It is also known to remove fluorosurfactant by adsorption onto an ion exchange resin as taught in U.S. Pat. No. 3,882,153 (Seki et al) and U.S. Pat. No. 4,282,162 (Kuhls). Kuhls teaches recovery of fluorinated emulsifiers dissolved in the aqueous phase after coagulation of the polymer from the dispersion or in aqueous polymer dispersions to be concentrated. US 2003/0125421 A1 (Bladel et al.) also teaches removal of fluorine-containing emulsifiers from fluoropolymer dispersion by contacting with an anion exchanger.

Known processes using anion exchange resins for the removal of fluorosurfactant from fluoropolymer dispersions employ either strongly basic anion exchange resins or weakly basic anion exchange resins. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media.

For practical commercial manufacture of fluoropolymer dispersion with low fluorosurfactant content, it is known to pass fluoropolymer dispersion through a fixed bed, such as a column of the anion exchange resin. However there is need to produce a uniform dispersion product, i.e., dispersion with a standard low level of reduced surfactant. Fluorosurfactant concentration analysis is routinely performed offline and takes around eight hours to complete the determination. Such a time lapse is not a practical way of determining whether acceptable product is being produced. Unacceptable product having a high fluorosurfactant content may result when a fixed bed is saturated such that the ion exchange sites are no longer adequately absorbing sufficient fluorosurfactant and thereby producing a dispersion with high, unacceptable fluorosurfactant content.

In a fixed bed such as a column, there is a working zone (mass transfer zone) that moves progressively through the column in the direction of flow of the dispersion such that the fluorosurfactant is absorbed onto the ion exchange resin in this working zone. Specifically, fluoropolymer dispersion enters the working zone having an initial fluorosurfactant content and exits the zone with reduced fluorosurfactant content. The fluoropolymer dispersion with reduced fluorosurfactant content passes through the remainder of the unsaturated column and exits the column. The working zone moves progressively through the column until the column is fully saturated. The point at which the column is fully saturated such that working zone has moved entirely though the column and there is no longer adequate absorption by the ion exchange resin is called breakthrough.

What is desired is a process for reducing the fluorosurfactant content of a stabilized fluoropolymer dispersion to detect working zone breakthrough at the end of a column, i.e., column saturation.

BRIEF SUMMARY OF THE INVENTION

The present invention relates to a process for reducing the fluorosurfactant content of a stabilized fluorosurfactant-containing aqueous fluoropolymer dispersion by passing dispersion through a first fixed bed of anion exchange resin to reduce fluorosurfactant content. The first fixed bed has a working zone which moves though the column as the ion exchange resin is saturated. The process includes monitoring a property of the dispersion as the dispersion exits the fixed bed to determine break though of the working zone indicating saturation of the fixed bed. The property being monitored is selected from the group consisting of pH and conductivity.

In a preferred embodiment, the process employs a second fixed bed where stabilized fluorosurfactant-containing aqueous fluoropolymer dispersion is passed to the second fixed bed when monitoring indicates saturation of the first fixed bed.

The process preferably reduces fluorosurfactant content to a predetermined level of no greater than about 300 ppm. more preferably a predetermined level no greater than about 100 ppm, and most preferably a predetermined level of no more than 50 ppm.

DETAILED DESCRIPTION OF THE INVENTION

As discussed above, the fluorosurfactant content of a stabilized fluorosurfactant-containing aqueous fluoropolymer dispersion can be reduced by passing the dispersion through a fixed bed of anion exchange resin. According to this invention, it is possible to determine the saturation of a first fixed of anion exchange resin by monitoring a property of the dispersion, that property being selected from the group consisting of pH and conductivity. In a preferred embodiment the fixed bed is contained in a column.

The present invention recognizes that as the working zone (defined above) moves through the first fixed bed and the fixed bed becomes saturated, there is change in the pH and the conductivity of the dispersion when the working zone reaches the end of the column, i.e., breakthrough occurs. By monitoring either the change in pH or the conductivity, the working zone breakthrough can be determined indicating a rise in the concentration of the fluorosurfactant. In this transition, pH decreases and conductivity increases. The change in pH and conductivity can be quite sharp, accurately identifying breakthrough within a narrow band of volume of dispersion passing through the column. For example, in a strongly basic anion exchange column in hydroxide ion from, the saturation of the column with a fluorosurfactant such as ammonium perfluorooctanoate slows or substantially stops the release of hydroxide ions results in a monitorable decrease in pH, e.g., 1 pH unit, and increase in conductivity, e.g., 100 µS. The volume of dispersion over this change occurs can be very small.

The monitoring preferably is done in-line and can indicate when to stop the treatment process or, preferably, when to divert the flow of stabilized fluorosurfactant-containing aqueous fluoropolymer dispersion to a second fixed bed of unsaturated anion exchange resin.

As will be described more fully below, in accordance with invention, the passing of the stabilized fluorosurfactant-containing aqueous fluoropolymer dispersion through a first fixed bed of anion exchange resin to reduce fluorosurfactant content reduces fluorosurfactant content to a predetermined level of no greater than about 300 ppm, more preferably a predetermined level no greater than about 100 ppm, especially a predetermined level no greater than about 50 ppm.

Fluoropolymer

The stabilized fluorosurfactant-containing aqueous fluoropolymer dispersion for treatment in accordance with the present invention is made by dispersion polymerization (also known as emulsion polymerization). The aqueous fluoropolymer dispersions is a stabilized fluorosurfactant-containing aqueous fluoropolymer dispersion which means that it contains sufficient nonionic surfactant to prevent coagulation of the dispersion when the fluorosurfactant content is reduced. As will be explained in more detail hereinafter, depending upon when the process of the invention is employed, the nonionic surfactant may already be present, i.e., if performed in a concentrated dispersion, or may be added for stabilization prior to treatment according to the invention. After concentration, aqueous fluoropolymer dispersions are useful as coating or impregnating compositions and to make cast films.

Fluoropolymer dispersions are comprised of particles of polymers made from monomers wherein at least one of the monomers contains fluorine. The fluoropolymer of the particles of the aqueous dispersions used in this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

The invention is especially useful when the fluoropolymer component of the dispersion is polytetrafluoroethylene (PTFE) including modified PTFE which is not melt-processable. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modified PTFE contains a small amount of comonomer modifier which improves film forming capability during baking (fusing), such as perfluoroolefin, notably hexafluoropropylene (HFP) or perfluoro (alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1\times10^9$ Pa·s. Such high melt viscosity indicates that the PTFE does not flow in the molten state and therefore is not melt-processable. PTFE and modified PTFE are frequently sold in dispersion form and transported in shipping containers and the process of the invention can be readily employed for reducing the fluorosurfactant content of such dispersions.

The fluoropolymer component of the dispersion may be melt-processable. By melt-processable, it is meant that the polymer can be processed in the molten state (i.e., fabricated from the melt into shaped articles such as films, fibers, and tubes etc. that exhibit sufficient strength and toughness to be useful for their intended purpose). Examples of such melt-processable fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processable copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processable fluoropolymers are the copolymers of ethylene or propylene with TFE or CTFE, notably ETFE, ECTFE and PCTFE. Further useful polymers are film forming polymers of polyvinylidene fluoride(PVDF) and copolymers of vinylidene fluoride as well as polyvinyl fluoride (PVF) and copolymers of vinyl fluoride.

Fluorosurfactants

The fluorosurfactant in the fluorosurfactant-containing dispersions to be reduced in this process is a non-telogenic, ionizable dispersing agent, soluble in water and comprising an ionic hydrophilic group and a hydrophobic portion. Preferably, the hydrophobic portion is an aliphatic fluoroalkyl group containing at least four carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Ion Exchange Resin

The anion exchange resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of undesirable anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBER-LITE®410, DOWEX® MARATHON A2, and DOWEX® UPCORE Mono A2.

Anion exchange resin used in the process of the present invention is preferably monodisperse. More preferably, the anion exchange resin beads have a number average size distribution in which 95% of the beads have a diameter within plus or minus 100 μm of the number average bead diameter.

The monodisperse anion exchange resin has a particle size which provides a suitable pressure drop through the bed. Very large beads are fragile and prone to breakage. Very small anion exchange beads are susceptible to tight particle packing resulting in tortuous channels in the bed. This can result in high shear conditions and high pressure drop in the bed. Preferred anion exchange resin has a number average bead size about 450 to about 800 μm, more preferably, the anion exchange resin beads have a number average bead diameter of about 550 to about 700 μm.

Non-Ionic Surfactants

Aromatic alcohol ethoxylates can be used as the nonionic surfactant for stabilization of fluorosurfactant-containing aqueous fluoropolymer dispersion prior to ion exchange treatment and also for the concentration of such dispersions according to the teachings of Marks et al., U.S. Pat. No. 3,037,953, and in Holmes, U.S. Pat. No. 3,704,272. However, due to some concern about possible environmental effect of aromatic compounds, preferred nonionic surfactants are aliphatic alcohol ethoxylates. Suitable nonionic surfactants include any of a variety of aliphatic alcohol ethoxylates or mixtures thereof which provide the desired cloud point during concentration and which provide desired properties in the dispersion, e.g., low burn off temperature, dispersion stability, etc. Many of these nonionic surfactant compositions are disclosed in Marks et al., U.S. Pat. No. 3,037,953 and Miura et al., U.S. Pat. No. 6,153,688. Especially preferred nonionic surfactants are a compound or mixture of compounds of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18 as disclosed in Cavanaugh, EP 1472307 A1.

Process

A typical process for the aqueous dispersion polymerization of preferred polymer PTFE is a process wherein TFE vapor is fed to a heated reactor containing fluorosurfactants, paraffin wax and deionized water. A chain transfer agent may also be added if it is desired to reduce the molecular weight of the PTFE. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and the dispersion is isolated and stabilized with nonionic surfactant. The stabilized dispersion preferably contains 2-11 wt % nonionic surfactant based on the weight of the fluoropolymer solids in the dispersion.

Fluoropolymer dispersion so produced will contain some amount of ferric ions either from the metal equipment used in polymerization and processing or from the addition of iron compounds such as catalysts etc. or due to their presence in the water itself. In process of this invention an effective amount of suitable chelating agent is preferably added to stabilized fluorosurfactant-containing aqueous fluoropolymer dispersion prior to contacting the fluorosurfactant-containing aqueous fluoropolymer dispersion with anion exchange resin in the hydroxide form. In this way, a strongly bonded iron complex is formed and scum formation is prevented.

The dispersion polymerization of melt-processable TFE copolymers is similar except that one or more comonomers are added to the batch initially and/or introduced during polymerization. In addition, a telogen such as a hydrocarbon is employed to control the molecular weight to achieve the desired melt flow of the polymer for the intended purpose.

The anion exchange process can be carried out by passing the stabilized dispersion through a fixed bed of anion exchange resin, preferably a column containing a fixed bed of anion exchange resin. Flow can be upward or downward through the bed and no separate separation step is needed since the resin remains in the fixed bed.

Prior to the stabilized dispersion entering the fixed bed, a value for the property to be monitored is determined, that is, the pH and/or conductivity of the stabilized dispersion, such as by using an in-line pH and/or conductivity meter. As the dispersion exits the fixed bed, a value for the pH and/or conductivity is again determined. A decrease in pH and/or an increase in conductivity is an indication of working zone breakthrough of the column. Because this monitoring is preferably done in-line, it can indicate when the anion exchange treatment is no longer producing stabilized dispersion with desired low level of surfactant and that the fixed bed is saturated and requires replacement. In a preferred embodiment of this invention, upon indication that the first fixed bed is saturated, the flow of stabilized fluorosurfactant-containing aqueous fluoropolymer dispersion is diverted to a second fixed bed of unsaturated anion exchange resin.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, or other forms of concentration etc.

After ion exchange treatment, the aqueous fluoropolymer dispersion with reduced fluorosurfactant content is transferred to a dispersion concentration operation. In the dispersion concentration operation, the dispersion is concentrated with the aid of a nonionic surfactant as taught in Marks et al., U.S. Pat. No. 3,037,953, and in Holmes, U.S. Pat. No. 3,704,272 to raise the solids from nominally 35 wt % to about 60 wt %. Miura et al., U.S. Pat. No. 6,153,688 discloses a similar process. The nonionic surfactant selected is typically the surfactant selected for stabilization when the dispersion is isolated (after wax removal) for ion exchange treatment.

As described above, the contacting of the stabilized dispersion with anion exchange resin has been carried out before concentration. This may be advantageous because of the low solids dispersion has lower viscosity and processing is facilitated. The process of this invention may also be carried out on stabilized dispersion which have been concentrated. The same anion exchange treatment and dispersion concentration operation used for PTFE dispersions can be used for TFE copolymer dispersions.

Example

The following illustrates the process of this invention on a stabilized aqueous PTFE dispersion prior to concentration. The dispersion has a fluoropolymer solids content of about 42 wt % contains about 4 wt % nonionic surfactant, Tergitol TMN-100X available from Dow Chemical Corporation. The dispersion contains about 1800 ppm ammonium perfluorooctanate and has a conductivity of 600 µS and a pH of 4.

The stabilized dispersion is passed through a fixed bed of commercially-available strong base anion exchange resin with quaternary ammonium groups with a trimethylamine moiety in hydroxide form (Dowex 550A) contained in a 14-inch diameter column approximately 8 feet long. In normal operation prior column saturation, stabilized dispersion passes through the working zone and exits the column. After about 250 gallons of stabilized dispersion have passed through the column, the dispersion as it exits the column has a conductivity of 200 µS and a pH of 10. Conductivity is determined in-line with a conductivity meter. The pH is determined in-line with a pH meter. The fluorosurfactant content is determined off-line and is determined to be 19 ppm, an indication of that the column is in good operating condition and not exhausted. After about 6000 gallons has flowed through the column, a sharp increase in conductivity to 300 µS and a sharp decrease in pH to 9 is detected for the dispersion exiting the column. These changes are an indication of working zone breakthrough of a saturated column and the need to discontinue use of this column. Flow is then diverted second fixed bed similar to the column described above containing unsaturated anion exchange resin.

For confirmation of the first column's saturation, the fluorosurfactant content of the stabilized surfactant prior to diversion of the surfactant to the second column, is determined off-line to be about 200 ppm, confirming breakthrough of the working zone, i.e., column saturation.

What is claimed is:

1. A process for reducing fluorosurfactant content of stabilized fluorosurfactant-containing aqueous fluoropolymer dispersion comprising:

passing said stabilized fluorosurfactant-containing aqueous fluoropolymer dispersion through a first fixed bed of anion exchange resin to reduce fluorosurfactant content, said first fixed bed having a working zone which moves through said fixed bed as said ion exchange resin is saturated; and monitoring in-line a property of said dispersion as said dispersion exits said first fixed bed to determine breakthrough of said working zone indicating saturation of said first fixed bed, said property selected from the group consisting of pH and conductivity.

2. The process of claim 1 further comprising passing said dispersion through a second fixed bed when said monitoring determines saturation of said first fixed bed.

3. The process of claim 1 wherein said fixed bed is contained in a column.

4. The process of claim 1 wherein said anion exchange resin comprising a polymer matrix and functional groups comprising quaternary ammonium groups.

5. The process of claim 1 wherein said anion exchange resin comprises beads of anion exchange resin, said beads being monodisperse.

6. The process of claim 1 wherein said passing said stabilized fluorosurfactant-containing aqueous fluoropolymer dispersion through a first fixed bed of anion exchange resin to reduce fluorosurfactant content reduces fluorosurfactant content to no greater than about 300 ppm.

7. The process of claim 1 wherein said passing said stabilized fluorosurfactant-containing aqueous fluoropolymer dispersion through a first fixed bed of anion exchange resin to reduce fluorosurfactant content reduces fluorosurfactant content to no greater than about 100 ppm.

8. The process of claim 1 wherein said passing said stabilized fluorosurfactant-containing aqueous fluoropolymer dispersion through a first fixed bed of anion exchange resin to reduce fluorosurfactant content reduces fluorosurfactant content to no greater than about 50 ppm.

* * * * *